HERMANN SCHMID
JAMES L. WEST
INVENTORS

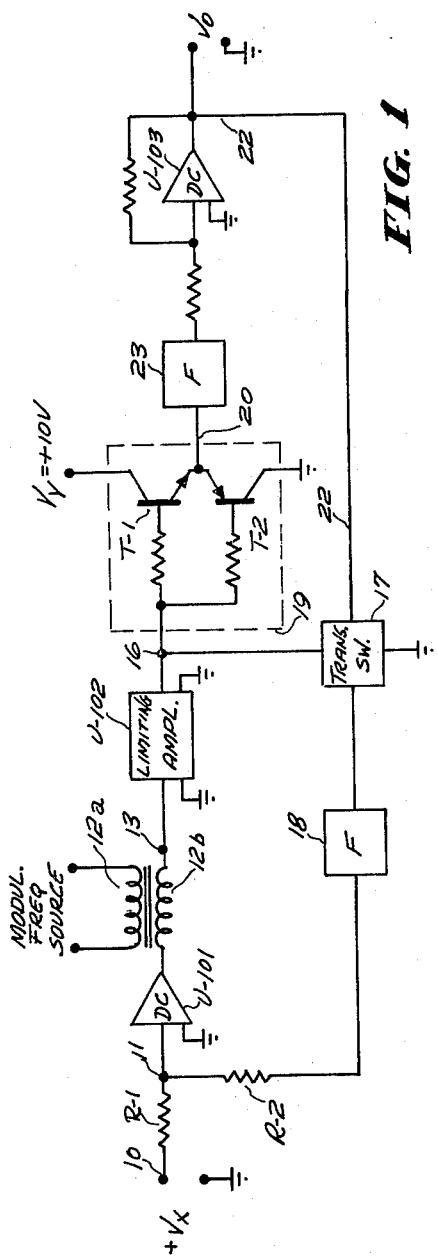
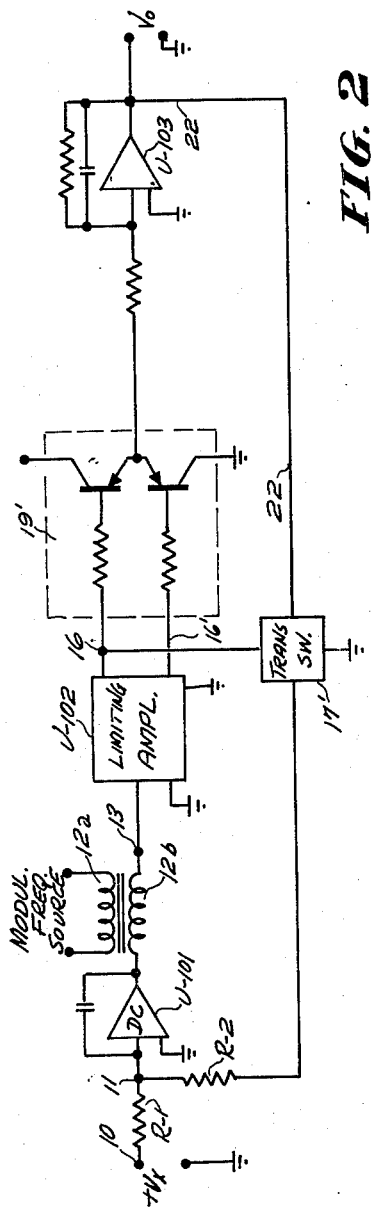
FIG. 1
FIG. 2
HERMANN SCHMID
JAMES L. WEST
INVENTORS
BY Richard G. Stephens
ATTORNEY

United States Patent Office 3,005,113
Patented Oct. 17, 1961

3,005,113
ELECTRONIC COMPUTER CIRCUITS
Hermann Schmid and James L. West, Binghamton, N.Y., assignors to General Precision, Inc., a corporation of Delaware
Filed Aug. 19, 1959, Ser. No. 834,725
9 Claims. (Cl. 307—88.5)

This invention relates to electronic computer circuits, and more particularly to an improved circuit for providing an output potential which varies in accordance with the square root of a single independent variable input quantity or the square root of the product of plural independent variable input quantities. In the analog computer, automatic control and instrumentation arts it is frequently necessary or desirable to extract square roots of input quantities. Problems in turbulent fluid flow which often arise in the course of simulation or control of industrial processes are typical, some of the most important being calculations of velocity of flow by Torricelli's theorem, calculation of velocity from Bernoulli's theorem for Pitot tubes, and calculation of the discharges measured by venturi meters or orifice meters. The most common electronic method of obtaining square roots is believed to be the use of a squaring device in the feedback path of a direct coupled amplifier. While such circuits are useful in some applications, they are characterized by certain limitations in accuracy and stability which give rise to a need for an improved root-taking computer. More particularly, the accuracy of such prior art circuits greatly decreases and the error greatly increases as the input signal decreases, and the outputs of some such circuits become completely unstable when the input signal reaches zero. One form of prior art device utilizes a diode squaring circuit in the feedback path of an amplifier. Diode circuits change with temperature and age, however, and require tedious calibration, so that other forms of electronic squaring devices have been tried in the feedback loops of amplifiers in attempts to provide square root computing circuits. A straightforward method of overcoming the inaccuracy of a diode circuit as a squaring device would be the use of a time division multiplier for squaring, but straightforward use of such multipliers makes the amplifier susceptible to occurrence of positive feedback at zero input signal conditions, with a complete loss of stability. The present invention overcomes both of these deficiencies and provides a square root computer of surprisingly high accuracy with simple and economical circuitry.

It is therefore a primary object of the invention to provide an improved electronic square-root computer circuit using simple, reliable and economical circuitry and having improved accuracy and stability.

While the mathematically correct square root of a negative number is imaginary, a number of applications exist for a computer circuit which will provide the square root of either a positive or a negative input, which can pass through zero, with the output of the circuit changing in polarity as the input signal changes. As far as I am aware, square-rooting circuits of this type are unknown in the prior art, since most, if not all square root circuits of the prior art become unstable near zero and are completely incapable of accepting input signals of either polarity. Thus it is another object of the invention to provide an improved square root computer circuit which will provide an output voltage which varies in magnitude in accordance with the square root of an input voltage of either polarity, with the output voltage also varying in polarity when the input voltage changes sign.

Other objects of the invention will in part be obvious and will in part appear hereinafter.

The invention accordingly comprises the features of construction, combinations of elements, and arrangement of parts, which will be exemplified in the constructions hereinafter set forth, and the scope of the invention will be indicated in the claims.

For a fuller understanding of the nature and objects of the invention reference should be had to the following detailed description taken in connection with the accompanying drawings, in which:

FIG. 1 is an electrical schematic diagram of an exemplary embodiment of the invention;

FIG. 2 illustrates an alternative embodiment of the invention utilizing push-pull electronic switches.

Figure 3:
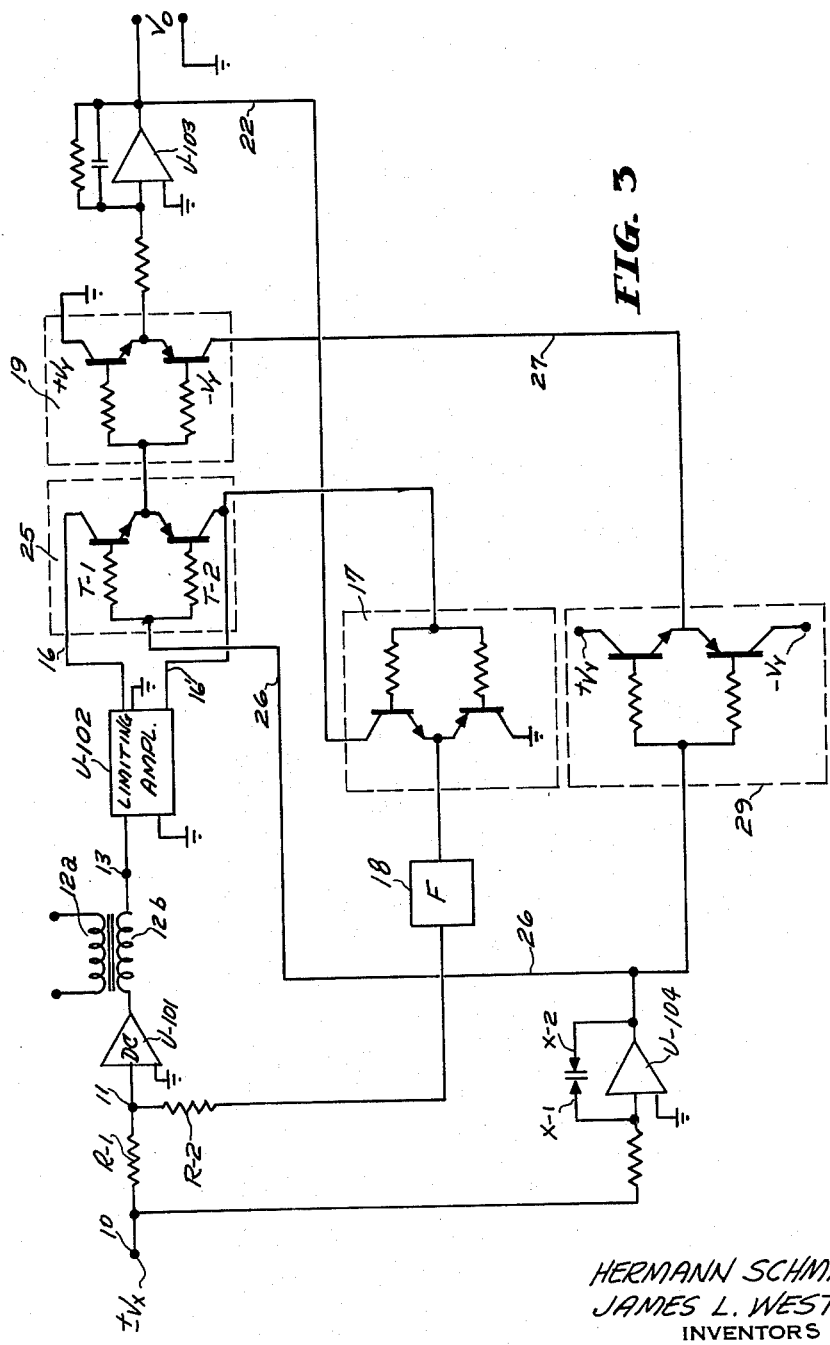
FIG. 3 shows a further embodiment of the invention, which is capable of accepting input signals of either polarity.

Referring to the drawing, there is shown an input terminal 10 to which a continuous input positive voltage $V_x$ commensurate in magnitude with an independent variable $x$ may be applied, for application through scaling resistance R–1 to the summing junction 11 of a feedback amplifier loop to be described. The potential applied via resistance R–1 is compared with a degenerative feedback potential applied via feedback resistance R–2, so that the error potential at terminal 11 with respect to the reference potential (ground) is commensurate with their difference. The error potential is amplified by direct-coupled amplifier U–101 and then superimposed on an alternating modulating potential. In the figure the output voltage from amplifier U–101 is shown connected to determine the D.C. or average level of the secondary winding 12b of a transformer, and the periodic modulating potential is induced into secondary winding 12b from primary winding 12a, thereby providing a composite potential at terminal 13 commensurate with the instantaneous algebraic sum of the output potential from amplifier U–101 and the periodic alternating potential induced in winding 12b. Various other means of superimposing two such potentials are known and may be substituted.

The alternating modulating potential may consist of either a sawtooth or sine wave potential or perhaps 1 or 2 kilocycles per second, for example, supplied to winding 12a from a conventional source (not shown). If the output voltage from amplifier U–101 is zero, so that winding 12b lies at ground potential, the composite potential at terminal 13 will be seen to be positive with respect to ground for exactly one half cycle and negative with respect to ground for exactly one half cycle of the modulating potential. If amplifier U–101 raises winding 12b to some positive value, it will be seen that the composite potential at 13 will be positive with respect to ground for more than one-half cycle and negative with respect to ground for less than one-half cycle. Conversely, if amplifier U–101 drives winding 12b negative, the time duration of the negative excursions of the composite potential will exceed the time duration of the positive excursions.

The composite potential is applied to an overdriven "blocking" or limiting amplifier U–102 shown in block form. Amplifier U–102 is arranged to saturate whenever its input potential exceeds a few millivolts with respect to ground in either direction, thereby providing substantially rectangular pulses at its output terminal 16. The rectangular pulses will vary in time duration in accordance with the variation of the polarity of the composite potential. The rectangular pulses at terminal 16 are applied through a transistor switch indicated generally at 17 and thence through a conventional filter 18 to provide the abovementioned degenerative feedback potential. It can be shown mathematically that if the loop gain of the loop circuit described is made high, the time-modulation of the rectangular pulses at terminal 16 will vary directly and vary linearly with the $V_x$ input potential. Using the circuit shown in the figure, amplifier U–101 was constructed to provide a voltage gain of approximately one million at zero frequency, which is easily achieved. Resistance R–2 actually may comprise a portion or all of the resistance of filter 18. If desired, filter 18 may be eliminated and a feedback capacitor connected across amplifier U–101 to give equivalent operation. The high loop gain around the pulse modulation circuit described makes the time-modulation of the pulses on conductor 16 vary linearly with the input signal even if a sine wave is used as a modulating frequency voltage instead of a linear sawtooth. The circuit is less susceptible to noise, however, if a sawtooth is used.

The rectangular pulses at terminal 16 are applied to drive the base electrodes of a transistor switch 19 shown as comprising a pair of complementary transistors T–1 and T–2. A constant voltage $V_y$ from the computer power supply (not shown) and ground voltage are applied to the collector electrodes as shown, and the emitters of the two transistors are joined together to provide a switch output terminal at 20. When the bases are driven positive by the rectangular pulses on conductor 16, NPN transistor T–1 will conduct, and a voltage which corresponds (except for an insignificant voltage drop of about 1 or 2 millivolts) to the voltage on the collector of transistor T–1 will appear on conductor 20. When the bases are driven negative by the rectangular pulses on conductor 16, PNP transistor T–2 will conduct, and a voltage which corresponds (except for the small millivolt drop) to ground or reference potential will appear at the common emitter terminal and conductor 20. The fact that such small voltage drops exist between collector and emitter of the conducting transistors is essential to the accuracy of the device. It will thus be seen that rectangular pulses varying between the constant collector voltage $V_y$ of transistor T–1 and ground and varying directly and linearly in time width in accordance with the $V_x$ input potential and inversely with the potential on conductor 22, $V_o$, will be derived on conductor 20.

Transistor switching circuit 17, which is shown in block form, may be identical to circuit 19, with the potential from terminal 16 connected to drive the transistor base electrodes and with the common emitter output connected to a conventional averaging means shown in block form as filter 18. Hence rectangular pulses varying in magnitude between the potential on conductor 22 and ground and varying in time width directly and linearly with $V_xV_o$ will be applied to filter 18. If the potential on conductor 22 is designated $V_o$, the pulses applied to filter 18 will be seen to have areas or average values commensurate with $$V_x = \frac{V_x}{V_o} \cdot V_o$$

so that the degenerative feedback potential applied via R–2 will be commensurate with $V_x$. The function of switching circuit 17 is to limit the rectangular pulses on conductor 16 and thereby modify them in amplitude in accordance with the value of $V_o$. Those skilled in the operational feedback amplifier art will be recognized that multiplication by $V_o$ in the feedback loop will provide an inverse effect on the output from the loop, so that the time-width of the pulses on terminal 16 and the time width of the pulses on conductor 20 will vary inversely with $V_o$ as well as varying directly with $V_x$. Thus the areas or average values of the pulses on conductor 20 vary in accordance with $$\frac{V_xV_y}{V_o}$$

and after filtering by conventional filter 23, a direct voltage commensurate with $$\frac{V_xV_y}{V_o}$$

is available to drive unity-gain, polarity-inverting direct-coupled amplifier U–103. Amplifier U–103 provides the circuit square root output quantity $V_o$ on conductor 22, and also applies this quantity back to switching circuit 17 for the purposes described above.

The output voltage $V_o$ from amplifier U–103 has been shown to be commensurate with $$\frac{V_xV_y}{V_o}$$

If $$V_o = \frac{V_xV_y}{V_o}$$

Then $V_o = \sqrt{V_xV_y}$, and if $V_y$ is a constant $k^2$, $V_o = k\sqrt{V_x}$.

Thus it will be seen that the $V_o$ output quantity will correspond to $\sqrt{V_xV_y}$ if the collector voltage $V_y$ of transistor T–1 is made to vary in accordance with a second independent variable $y$, and to correspond to $k\sqrt{V_x}$ where the collector voltage of T–1 is held constant.

In some respects the present invention is an improvement of or extension of inventions shown in copending applications Ser. Nos. 693,298 and 761,200, of Hermann Schmid, which applications are assigned to the same assignee as the present invention. The transistor switch shown in FIG. 1 is the complementary switch described in detail in Application Ser. No. 761,200, while the push-pull switch shown in FIG. 2 is described in detail in Application Ser. No. 693,298. As far as understanding of the present invention is concerned, the two different types of electronic switch, or pulse amplitude-limiting circuit, may be regarded as being equivalent, so that no detailed description of FIG. 2 will be necessary herein. FIG. 2 differs from FIG. 1 only in that push-pull transistor switches are shown in place of complementary transistor switches, and the filters have been altered as described above. Use of the push-pull switches requires that blocking amplifier U–102 provide push-pull outputs. The use of push-pull switches allows use of a single type of transistor in each switch, however.

The circuit described solves square roots with an accuracy better than 0.05% of full scale output for input voltages between 1 millivolt and 10 volts. Furthermore at zero input signal conditions the circuit output with low-drift D.C. amplifiers is absolutely stable and has a zero offset of less than 0.05%. If a diode squaring device is used in the feedback path of an amplifier in the prior art manner, accuracy seldom exceeds 1% unless expensive temperature controls and special techniques are employed. If an ordinary time-division multiplier is used for squaring in the prior art manner, accuracy is improved over the diode circuit, but instability generally arises near zero. This arises because such squaring circuits provide the same polarity output regardless of the polarity of their input. For example, they may provide +4 volts out regardless of whether their input is –2 volts or +2 volts, which amounts to true mathematical squaring, taking into consideration the sign of the input as well as the magnitude of the input. In the present invention, however, the sign of the feedback voltage applied to amplifier U–101 changes if the input signal changes, or more importantly, if drift or noise around zero goes in either direction, so that the feedback voltage to U–101 always remains degenerative and stability is insured. In the prior art device described, if noise or drift or offset in the input signal occurs so that a slight negative quantity is being fed to the circuit, positive feedback results and the prior art circuit saturates, usually at the supply voltage of the amplifier. Conversely in the present invention, in the embodiments of FIGS. 1 and 2, if negative voltages are applied to the circuit the output voltage remains at zero and no saturation occurs. Since the invention cannot saturate around zero, no long recovery time is required as in the case of the prior art circuits.

In some computer applications it is necessary or desirable to have available a square root computer which will accept input signals of either polarity and provide an output signal according to the square root of the magnitude of the input which also varies in accordance with the sign of the input. FIG. 3 shows an embodiment of the invention capable of such operation. FIG. 3 corresponds exactly to FIG. 1 except for certain additional parts and changes now to be described.

Limiter or blocking amplifier U–102 is arranged to provide push-pull rectangular-wave outputs on conductors 16 and 16' for connection to an additional transistor switch shown within dashed lines at 25 which is inserted between amplifier U–102 and switch 19. Switch 25 is controlled by a switching control signal developed on conductor 26 by means shown as comprising amplifier U–104. The input voltage on terminal 10 is sensed by amplifier U–104 and considerably amplified, so that the output of amplifier U–104 swings between maximum positive and negative output voltages as the input signal at terminal 10 swings between one or two millivolts negative and positive respectively. Zener diodes X–1, X–2 placed back-to-back around amplifier U–104 limit the output voltage of amplifier U–104 to a safe value (about 22 volts in the embodiment shown), both to prevent damage to switch 25 and to prevent saturation of amplifier U–104, which would otherwise disable the computer during amplifier recovery time. When the input signal on terminal 10 is positive, the output signal of amplifier U–104 becomes 22 volts negative, which causes transistor T–1 of switch 25 to conduct, effectively connecting conductor 16 to the bases of switch 19, so that the circuit of FIG. 3 operates just like the circuit of FIG. 1. When the input signal on terminal 10 goes negative, the output signal from amplifier U–104 becomes 22 volts positive, causing NPN transistor T–2 of switch 25 to conduct, effectively connecting conductor 16' to the bases of switch 19. The change in input signal polarity will have changed the sense of the time-modulated output signals, however, so that conductor 16' now will have pulses of the same polarity as those produced at 16 during opposite input. The polarity of the potential provided at the common emitter terminal of switch 19, however, depends upon the polarity applied to switch 19 from a second additional switch 29. As shown, switch 29 also is controlled by the switching control voltage on conductor 26, thereby providing an opposite polarity output at the common emitter terminal of switch 19, an opposite polarity output from amplifier U–103, and an opposite polarity feedback voltage from switch 17 to amplifier U–101. Thus the circuit of FIG. 3 provides an output which varies in accordance with the square root of the magnitude of its input signal, with the output also changing sign as the input changes sign. Thus in a fluid flow problem, for example, the output voltage magnitude of the circuit may represent fluid velocity, while the output sign represents direction of flow. The circuit of FIG. 3 may be operated with inputs of either sign and with inputs which pass through zero without encountering instability.

Any of the embodiments of the invention may use either the complementary switch or a push-pull switch in any of the locations where transistor switches are shown, and pulse averaging or filtering may be done by either the separate low-pass filters or the amplifier feedback capacitors. Each of the feedback amplifiers may be either a vacuum tube or a transistor type and may incorporate known drift-correction and stabilization techniques. Exemplary circuit values and transistor types are shown in the abovementioned copending applications, to which reference may be had.

It will thus be seen that the objects set forth above, among those made apparent from the preceding description, are efficiently attained, and since certain changes may be made in the above constructions without departing from the scope of the invention, it is intended that all matter contained in the above description or shown in the accompanying drawings shall be interpreted as illustrative and not in a limiting sense.

Having described our invention, what we claim as new and desire to secure by Letters Patent is:

1. An electronic computer circuit for providing an output voltage which varies in accordance with the square root of an input voltage, comprising in combination; first amplifier means responsive to said input voltage and to a feedback voltage and operative to provide a time-modulated first line of pulses which vary directly in width according to said input voltage and inversely in width according to said feedback voltage; a first transistor switching circuit comprising a first PNP transistor and a first NPN transistor each having a base, an emitter and a collector, said bases being connected to be driven by said first line of pulses, said emitters being interconnected at a first common terminal, said output voltage being connected to the collector of one of said transistors and a reference potential being connected to the collector of the other of said transistors; first filter means connecting said first common terminal to said first amplifier means to provide said feedback voltage; a second transistor switching circuit comprising a second PNP transistor and a second NPN transistor each having a base, an emitter and a collector, said bases of said second transistors being connected to be driven by said first line of pulses, said emitters of said second transistors being interconnected at a second common terminal, the collector of one of said second transistors being connected to a third voltage and the collector of the other of said transistors being connected to said reference potential; second amplifier means to provide said output voltage, and second filter means connecting said second common terminal to said second amplifier means.

2. An electronic computer circuit for providing an output voltage which varies in accordance with the square root of an applied input voltage, comprising in combination; first amplifier means responsive to said input voltage and to a feedback voltage and operative to provide mutually inversely related first and second time-modulated lines of pulses which vary directly in width according to said input voltage and inversely in width according to said feedback voltage; a first transistor switching circuit comprising first and second transistors of like conductivity type each having a base, an emitter and a collector, said bases being connected to be driven by respective of said first and second lines of pulses, said emitters being interconnected at a first common terminal, said output voltage being connected to the collector of one of said transistors and a reference potential being connected to the collector of the other of said transistors; first filter means connecting said first common terminal to said first amplifier means to provide said feedback voltage; a second transistor switching circuit comprising third and fourth transistors of like conductivity type each having a base, an emitter and a collector, said bases of said third and fourth transistors being connected to be driven by respective of said first and second lines of pulses, said emitters of said third and fourth transistors being interconnected at a second common terminal, the collectors of said third and fourth transistors being connected respectively to fourth and fifth potentials; second filter means connected to said second common terminal for providing said third voltage; and second amplifier means including a polarity-inverting amplifier responsive to said third voltage for providing said output voltage.

3. An electronic computer circuit for providing an output voltage which varies in accordance with the square root of an input voltage, comprising in combination: first amplifier means responsive to said input voltage and to a feedback voltage for providing time-modulated rectangular-wave signals which vary directly in width according to said input voltage and inversely in width according to said feedback voltage; a first transistor switching circuit comprising first and second transistors each having a base, an emitter and a collector, said bases being connected to be driven by said time-modulated rectangular-wave signals, said emitters being interconnected at a first common terminal, said collectors being connected across a third voltage which varies in proportion to said output voltage; first filter means connecting said first common terminal to said first amplifier means to provide said feedback voltage; a second transistor switching circuit comprising third and fourth transistors each having a base, an emitter and a collector, said bases of said third and fourth transistors being connected to be driven by said time-modulated rectangular-wave signals, said emitters of said third and fourth transistors being interconnected at a second common terminal, said collectors of said third and fourth transistors being connected across a fourth voltage; and second amplifier means connected to said second common terminal via second filter means to provide said output voltage.

4. An electronic computer circuit for providing an output voltage which varies in accordance with the square root of an input voltage, comprising in combination; a first feedback loop circuit comprising a first amplifier, a first voltage modulating circuit and a first pulse amplitude-limiting circuit, said first amplifier being responsive to said input voltage and a first feedback voltage and operative to provide an amplified error voltage, said voltage-modulating circuit being responsive to said amplified error voltage and a modulating frequency signal and operative to provide time-modulated rectangular-wave pulse signals which vary in width directly according to said input voltage and inversely according to said feedback voltage, said first pulse amplitude-limiting circuit being controlled by said output voltage and operative to provide further rectangular-wave pulses, said further rectangular-wave pulses being connected to said first amplifier by means of a first filter to provide said first feedback voltage; and a second feedback loop circuit comprising a second pulse amplitude-limiting circuit, a second amplifier and a second filter, said second pulse amplitude-limiting circuit being controlled by a third voltage and operative to provide a third line of pulses, said second filter means being connected to average said third line of pulses to provide a fourth voltage, said amplifier means being responsive to said fourth voltage for providing said output voltage, at least one of said pulse amplitude-limiting circuits comprising two transistors each having a base, an emitter and a collector, said bases being connected to be driven by rectangular-wave pulses and said emitter being interconnected to provide an output terminal from said one of said pulse amplitude-limiting circuits.

5. An electronic computer circuit for providing an output voltage which varies in magnitude in accordance with the square root of an input voltage and which varies in sign in accordance with the polarity of said input voltage, comprising in combination; first amplifier means responsive to said input voltage and to a feedback voltage for providing first and second lines of inversely related time-modulated rectangular pulses which vary directly in width according to said input voltage and inversely in width according to said feedback voltage; a first transistor switching circuit comprising first and second transistors of opposite conductivity types each having a base, an emitter and a collector, said emitters being connected together at a first common terminal, said first and second lines of pulses being connected respectively to said collector electrodes and said bases being connected to a switching control voltage; a second transistor switching circuit comprising third and fourth transistors each having a base, an emitter and a collector, said bases being connected to said first common terminal, said collectors being connected across a fourth voltage, said emitters being connected together at a second common terminal; a third transistor switching circuit comprising fifth and sixth transistors each having a base, an emitter and a collector, said bases being connected to be driven by at least one of said lines of time-modulated rectangular pulses, said emitters being connected together at a third common terminal, said collectors being connected across said output voltage; second amplifier means and first circuit means including first filter means for applying the voltage at said second common terminal to said second amplifier means to provide said output voltage from said second amplifier means; second circuit means including second filter means for connecting said third common terminal to said first amplifier means to provide said feedback voltage; third circuit means responsive to said output voltage for applying said fifth voltage across said collectors of said third transistor switching circuit; and means responsive to said input voltage for providing said switching control voltage, said switching control voltage varying in sense in accordance with the polarity of said input voltage and being operable to selectively connect either of said first and second lines of pulses to said first common terminal depending upon the polarity of said input voltage and operable to change the polarity of said fourth voltage as said input voltage changes in polarity.

6. A circuit according to claim 3 having a further transistor switching circuit connected between said first amplifier means and said first transistor switching circuit, said first amplifier means being operable to provide a push-pull time-modulated rectangular-wave signal on first and second conductors, said further transistor switching circuit being operable under control of a switching control voltage to selectively connect said first or second conductor to the bases of said first transistor switching circuit, said further transistor switching circuit comprising fifth and sixth transistors each having a base, an emitter and a collector, said bases of said further transistor switching circuit being connected to said switching control voltage, said collectors of said further transistor switching circuit being connected to said first and second conductors, said emitters of said further transistor switching circuit being connected to said bases of said first transistor switching circuit; and further means responsive to said input voltage for providing said switching control voltage and for switching the polarity of said fourth voltage, said switching control voltage and said fourth voltage varying in polarity in accordance with variations in polarity of said input voltage.

7. An electronic computer circuit for providing an output voltage which varies in accordance with the square root of an input voltage, comprising in combination; a pulse-modulation circuit operably responsive to said input voltage and a second voltage and operable to provide time-modulated rectangular-wave signals which vary directly in width in accordance with said input voltage and which vary inversely in width in accordance with said second voltage; a first transistor switching circuit comprising first and second transistors each having a base, an emitter and a collector, said bases of said transistors being connected to said rectangular-wave signals, said emitters of said transistors being connected together at a first common terminal, a third voltage being connected between said collectors; a direct-coupled amplifier; first circuit means including filter means for coupling said first common terminal to the input circuit of said amplifier, said amplifier providing said output voltage, said output voltage being connected to said pulse-modulation circuit to provide said second voltage.

8. A circuit according to claim 7 in which said pulse-modulation circuit provides mutually inverse rectangular-wave pulses on first and second lines, a further transistor switch connected between said pulse-modulation circuit and said first transistor switching circuit to selectively connect either said first or second line of pulses to said first transistor switching circuit depending upon the polarity of a switching control voltage connected to said further transistor switch; means responsive to the polarity of said input voltage for providing said switching control voltage; and means responsive to said switching control voltage for controlling the polarity of said third voltage.

9. Apparatus according to claim 8 in which the last-recited means comprises an additional transistor switching circuit comprising fifth and sixth transistors each having a base, an emitter and a collector electrode, said bases being connected to said switching control voltage, said collectors being connected to opposite-polarity fifth and sixth voltages, said emitters being connected together and to apply said third voltage to said first transistor switching circuit.

References Cited in the file of this patent

UNITED STATES PATENTS

| | | |
|---|---|---|
| 2,820,855 | Sherr | Jan. 21, 1958 |
| 2,880,332 | Wanlass | Mar. 31, 1959 |
| 2,891,174 | Hawkins | June 16, 1959 |
| 2,905,835 | Wray | Sept. 22, 1959 |